(12) United States Patent
Jahge et al.

(10) Patent No.: US 10,258,050 B2
(45) Date of Patent: Apr. 16, 2019

(54) HOUSEHOLD APPLIANCE MIXING ARRAGEMENT

(71) Applicant: Aktiebolaget Electrolux, Stockholm (SE)

(72) Inventors: Anders Jahge, Stockholm (SE); Martin Kwarnmark, Stockholm (SE)

(73) Assignee: Aktiebolaget Electrolux (SE)

( * ) Notice: Subject to any disclaimer, the term of this patent is extended or adjusted under 35 U.S.C. 154(b) by 137 days.

(21) Appl. No.: 15/321,463

(22) PCT Filed: Jul. 3, 2014

(86) PCT No.: PCT/EP2014/064209
§ 371 (c)(1),
(2) Date: Dec. 22, 2016

(87) PCT Pub. No.: WO2016/000782
PCT Pub. Date: Jan. 7, 2016

(65) Prior Publication Data
US 2017/0156349 A1   Jun. 8, 2017

(51) Int. Cl.
*A21C 1/06* (2006.01)
*A21C 1/14* (2006.01)
(Continued)

(52) U.S. Cl.
CPC ............ *A21C 1/06* (2013.01); *A21C 1/1405* (2013.01); *A21C 1/149* (2013.01); *A47J 43/07* (2013.01);
(Continued)

(58) Field of Classification Search
CPC ......... A21C 1/06; A21C 1/1405; A21C 1/149; A47J 43/06; A47J 43/07; A47J 43/08;
(Continued)

(56) References Cited

U.S. PATENT DOCUMENTS 743,090 A * 11/1903 Koelner .................... A21C 1/06
366/99
898,211 A * 9/1908 Friedman ................. A21C 1/06
366/99
(Continued)

FOREIGN PATENT DOCUMENTS

CN     103260490 A    8/2013
EP     0052582 A1     5/1982
(Continued)

OTHER PUBLICATIONS

Final Office Action for U.S. Appl. No. 15/321,346, dated Jun. 5, 2018, 19 pages.
(Continued)

*Primary Examiner* — Tony G Soohoo
(74) *Attorney, Agent, or Firm* — RatnerPrestia

(57) ABSTRACT

A household mixer appliance having an open top mixing container, a hook and a drive arrangement. The mixing container has a side wall portion with a through hole for the drive arrangement and the hook is arranged to be rotatable around an axis of rotation within the mixing container via the drive arrangement. A seal is arranged between the drive arrangement and the side wall portion of the mixing container, and the drive arrangement includes a quick-release mechanism to which the hook is attachable.

11 Claims, 3 Drawing Sheets

(51) Int. Cl.
*B01F 7/00* (2006.01)
*A47J 43/06* (2006.01)
*A47J 43/07* (2006.01)
*A47J 43/08* (2006.01)
*B01F 15/00* (2006.01)

(52) U.S. Cl.
CPC .............. *A47J 43/08* (2013.01); *B01F 7/002* (2013.01); *B01F 7/00275* (2013.01); *B01F 7/00325* (2013.01); *B01F 15/00538* (2013.01); *A47J 43/06* (2013.01); *B01F 2215/0011* (2013.01)

(58) Field of Classification Search
CPC ........ B01F 15/00538; B01F 2215/0011; B01F 7/002; B01F 7/00275; B01F 7/00325
See application file for complete search history.

(56) References Cited

U.S. PATENT DOCUMENTS

| | | | | |
|---|---|---|---|---|
| 905,148 | A | * | 12/1908 | Collins .................... A21C 1/06 366/99 |
| 935,688 | A | * | 10/1909 | Ray .......................... A21C 1/06 366/99 |
| 960,878 | A | * | 6/1910 | Friedman ................. A21C 1/06 366/99 |
| 969,311 | A | * | 9/1910 | Van Houten ............. A21C 1/06 277/385 |
| 1,229,934 | A | | 6/1917 | Gensheimer |
| 1,336,783 | A | * | 4/1920 | Lauterbur ................. A21C 1/06 366/99 |
| 1,426,444 | A | * | 8/1922 | Allison .................... A21C 1/06 366/70 |
| 1,585,155 | A | | 5/1926 | Konigsberg |
| 1,585,725 | A | * | 5/1926 | Lauterbur ................. A21C 1/06 184/13.1 |
| 2,723,110 | A | * | 11/1955 | Collins ................... A47J 43/07 192/114 R |
| 3,531,092 | A | | 9/1970 | Praschak et al. |
| 3,892,388 | A | | 7/1975 | Wass et al. |
| 4,334,789 | A | * | 6/1982 | Eusterbarkey ...... B01F 7/00391 366/343 |
| 4,357,109 | A | | 11/1982 | Blakeway |
| 4,436,432 | A | * | 3/1984 | Drocco .................... A21C 1/06 366/185 |
| 4,509,860 | A | * | 4/1985 | Lasar, III ............. A21C 1/1405 366/185 |
| 4,630,930 | A | * | 12/1986 | Seiling .................... A21C 1/06 366/189 |
| 4,650,337 | A | * | 3/1987 | Otto ........................ A21C 1/06 241/101.8 |
| 4,936,766 | A | | 6/1990 | Marshall et al. |
| 4,941,750 | A | | 7/1990 | Bouchez et al. |
| 5,421,713 | A | | 6/1995 | Backus et al. |
| 5,568,976 | A | | 10/1996 | Gabriele |
| 5,758,963 | A | | 6/1998 | Xie et al. |
| 6,435,708 | B1 | | 8/2002 | Huang |
| 6,508,423 | B2 | | 1/2003 | Gloor |
| 7,404,666 | B2 | | 7/2008 | Tessien |
| 7,677,790 | B2 | | 3/2010 | Tessien |
| 8,272,775 | B2 | | 9/2012 | Stalder |
| 2009/0080284 | A1 | | 3/2009 | Deusser et al. |
| 2010/0012639 | A1 | * | 1/2010 | Merrell ................. A47J 36/165 219/201 |
| 2014/0000462 | A1 | | 1/2014 | Payen |
| 2015/0335204 | A1 | | 11/2015 | Palmer et al. |
| 2017/0150728 | A1 | * | 6/2017 | Rojas Restrepo .. A47J 43/0727 |
| 2017/0156348 | A1 | * | 6/2017 | Rojas Restrepo ...... A47J 43/07 |
| 2017/0156349 | A1 | * | 6/2017 | Jahge ...................... A47J 43/07 |

FOREIGN PATENT DOCUMENTS

| | | |
|---|---|---|
| FR | 2994815 A1 | 3/2014 |
| GB | 15304 | 6/1915 |
| JP | 09294551 A | 11/1997 |
| WO | 2006113466 A2 | 10/2006 |

OTHER PUBLICATIONS

Non Final Office Action for U.S. Appl. No. 15/321,346, dated Jan. 11, 2018, 21 pages.
Final Office Action for U.S. Appl. No. 15/321,350, dated May 18, 2018, 16 pages.
International Search Report and Written Opinion of the International Searching Authority for International Application No. PCT/EP2014/064205, dated Dec. 3, 2014, 9 pages.
International Preliminary Report on Patentability for International Application No. PCT/EP2014/064205, dated Jan. 3, 2017, 7 pages.
International Search Report and Written Opinion of the International Searching Authority for International Application No. PCT/EP2014/064207, dated Mar. 23, 2015, 9 pages.
International Preliminary Report on Patentability for International Application No. PCT/EP2014/064207, dated Jan. 3, 2017, 7 pages.
International Search Report and Written Opinion of the International Searching Authority for International Application No. PCT/EP2014/064209, 9 pages.
International Preliminary Report on Patentability for International Application No. PCT/EP2014/064209, dated Jan. 3, 2017, 6 pages.
Chinese Office Action for Chinese Application No. 201480079686.6, dated Jul. 20, 2018, 10 pages.

* cited by examiner

HOUSEHOLD APPLIANCE MIXING ARRAGEMENT

This application is a U.S. National Phase application of PCT International Application No. PCT/EP2014/064209, filed Jul. 3, 2014, which is incorporated by reference herein.

TECHNICAL FIELD

Embodiments herein relate to a household appliance mixing arrangement.

BACKGROUND

A household appliance mixing arrangement for mixing and/or blending foodstuff commonly comprises a mixing container and a hook which is rotatable in the mixing container. The household appliance mixing arrangement will usually also comprise a base unit, a drive arrangement and an electric motor. The base unit often forms a support for the mixing container and the electric motor is arranged to rotate the hook via the drive arrangement. Such appliances are often referred to under different names such as mixer, food mixer, food processor, stand mixer or kitchen machine.

Hooks of household appliance mixing arrangements are typically vertically arranged, such that each respective hook rotates around a vertical axis of rotation directed towards a bottom portion of the mixing container, describing a planetary motion. The hook is, at an upper end, attached to the drive arrangement which in turn is arranged above both the hook and the mixing container.

In GB191415304A an apparatus for mixing and stirring liquids is provided. A number of stirrer-pairs are attached to a horizontal shaft by bolts. The shaft is a through shaft which passes through two oppositely arranged container walls. The apparatus in GB191415304A could be suitable for some applications, such as for stirring liquids, but seems unsuitable for ingredients with higher viscosities. The construction of the apparatus in GB191415304A seems also somewhat complex. Further, both assembly, disassembly and cleaning of the apparatus appears to be rather time consuming.

Accordingly, there remains a need for an improved and/or an alternative household appliance mixing arrangement.

SUMMARY

The household appliance mixing arrangement, as set out herein, eliminates or at least reduces the problems and/or drawbacks associated with previously known household appliance mixing arrangements.

According to a first aspect, this is provided by a household appliance mixing arrangement comprising an open top mixing container, a hook and a drive arrangement. The mixing container comprises a side wall portion with a through hole for the drive arrangement and the hook is arranged to be rotatable around an axis of rotation within the mixing container via the drive arrangement. The household appliance mixing arrangement further comprises a sealing arranged between the drive arrangement and the side wall portion of the mixing container, and the drive arrangement comprises a quick-release-hook-attachment arrangement to which the hook is attachable.

Since the household appliance mixing arrangement comprises a sealing arranged between the drive arrangement and the side wall portion of the mixing container, and the drive arrangement comprises a quick-release-hook-attachment arrangement to which the hook is attachable, it is easy both to attach the hook to the drive arrangement and to remove the hook from the drive arrangement. A user is allowed to quickly remove the hook, while the sealing prevents ingredients in the mixing container from escaping via the through hole since it is arranged between the drive arrangement and the side wall portion of the mixing container.

Optionally the hook comprises a distal end and a proximal end provided with a sole attachment portion which is arranged to be attachable to the quick-release-hook-attachment arrangement of the drive arrangement.

Since the hook comprises a distal end and a proximal end provided with a sole attachment portion which is arranged to be attachable to the quick-release-hook-attachment arrangement of the drive arrangement, the connection between the parts is strong and reliable. With a sole attachment portion, the rest of the hook can be used for kneading and mixing foodstuff. In addition, a sole attachment portion makes the hook easy to handle and economically efficient to produce.

A sole attachment portion also decreases the risk of leakage, as compared to solutions according to the prior art where two shaft apertures are required.

Optionally the quick-release-hook-attachment arrangement is at least one of a locking pin arrangement, a bayonet coupling arrangement and a snap-lock arrangement.

A locking pin arrangement, a bayonet coupling arrangement and/or a snap-lock arrangement, provides for a strong and reliable attachment between the drive arrangement and the hook. A locking pin arrangement, a bayonet coupling arrangement and/or a snap-lock arrangement allows the drive arrangement and the hook to be attached and detached relatively each other in a quick and easy manner without any tools.

Optionally the axis of rotation is substantially horizontal.

Since the axis of rotation is substantially horizontal, the household appliance mixing arrangement is very steady with a relatively low center of gravity. The open top mixing container combined with the substantially horizontal axis of rotation also facilitates for a user who would like to add ingredients to the mixing container, e.g. during baking.

Optionally the drive arrangement comprises a first coupling member which, at least partly, is arranged to extend into the through hole of the mixing container.

Since the drive arrangement comprises a first coupling member which, at least partly, is arranged to extend into the through hole of the mixing container, the mixing container and the drive arrangement will be positioned correctly relatively each other when the mixing container is arranged in a position in which mixing is possible. A user can hereby easily place the mixing container in a correct position, since the contact between the first coupling member and the mixing container will guide the mixing container to be placed correctly.

Optionally the hook is attachable to the first coupling member via the quick-release-hook-attachment arrangement.

Since the hook is attachable to the first coupling member via the quick-release-hook-attachment arrangement, the hook can easily be attached to the first coupling member. The hook, which is arranged within the mixing container, and the first coupling member, of which a major part is arranged outside of the mixing container, will hereby be positioned relatively each other. In addition, since they are attached to each other via the through hole of the mixing container, it is also assured that the mixing container is secured in the correct position.

Optionally the hook and the mixing container are detachable from the drive arrangement when the hook is detached from the quick-release-hook-attachment arrangement.

Since the hook and the mixing container are detachable from the drive arrangement when the hook is detached from the quick-release-hook-attachment arrangement, both the hook and the mixing container can easily be removed, e.g. for cleaning.

Optionally the sealing is arranged to be fitted in between the side wall portion of the mixing container and the first coupling member.

Since the sealing is arranged to be fitted in between the side wall portion of the mixing container and the first coupling member, any gap between the parts are sealed such that no ingredients can leak out.

Optionally the first coupling member comprises a flange, and the sealing is arranged radially outwards of the flange, towards a cylindrical surface which forms the through hole.

Since the first coupling member comprises a flange, and the sealing is arranged radially outwards of the flange, towards a cylindrical surface which forms the through hole, the sealing can be thread onto the flange and secured in a gap formed between the flange and the mixing container. The flange, the sealing and the cylindrical surface which forms the through hole will be concentrically arranged around the axis of rotation.

Optionally the sealing and the first coupling member together are arranged to seal off the through hole when the hook is attached to the drive arrangement.

Since the sealing and the first coupling member together are arranged to seal off the through hole when the hook is attached to the drive arrangement, ingredients are prevented from leaking out via the through hole.

Optionally the drive arrangement comprises a second coupling member which is arranged to transfer a rotational movement from an electric motor to the hook via the first coupling member.

Since the drive arrangement comprises a second coupling member which is arranged to transfer a rotational movement from an electric motor to the hook via the first coupling member, the hook will be brought to rotate inside the mixing container.

Optionally the hook, the quick-release-hook-attachment arrangement, the mixing container, the sealing and the first coupling member together form an assembly which is detachable as one unit from the second coupling member.

Since the hook, the quick-release-hook-attachment arrangement, the mixing container, the sealing and the first coupling member together form an assembly which is detachable as one unit from the second coupling member, the assembly can easily be removed from the second coupling member. Hereby a user is able to remove the mixing container together with the hook without first having to release the hook from the first coupling member. The sealing is still sealing any gap between the mixing container and the first coupling member. The possibility to remove the hook, the quick-release-hook-attachment arrangement, the mixing container, the sealing and the first coupling member as one assembly is very advantageous since a user is allowed to quickly remove the assembly, e.g. for adding ingredients at another location than where the second coupling member and any other parts of the household appliance mixing arrangement are placed. The second coupling member can be coupled to a drive member, a base unit and an electric motor.

Thus, hereby is provided an alternative household appliance mixing arrangement and/or a household appliance mixing arrangement eliminating or at least reducing the problems and/or drawbacks associated with prior art household mixing appliances.

BRIEF DESCRIPTION OF THE DRAWINGS

The various aspects of embodiments herein, including its particular features and advantages, will be readily understood from the following detailed description and the accompanying drawings, in which.

DETAILED DESCRIPTION

Embodiments herein will now be described more fully with reference to the accompanying drawings. Like numbers refer to like elements throughout.

Well-known functions or constructions will not necessarily be described in detail for brevity and/or clarity.

Figure 1:
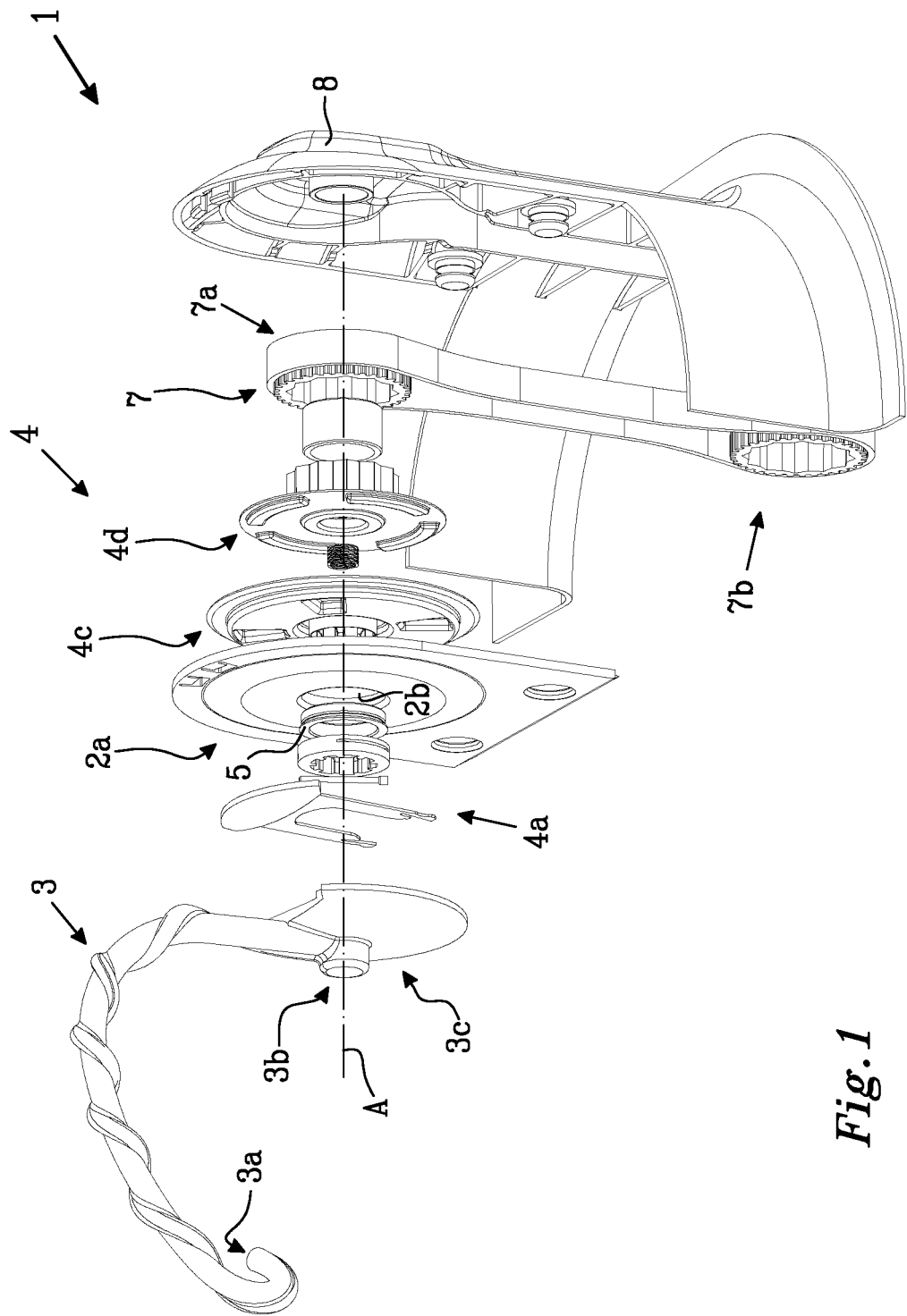
FIG. 1 illustrates a perspective view of a household appliance mixing arrangement according to some embodiments.

FIG. 1 illustrates a household appliance mixing arrangement 1 in perspective. The mixing arrangement 1 is illustrated in an exploded view, where the parts and features are separated in a direction parallel to the illustrated axis of rotation A.

In the left part of FIG. 1 a hook 3 is illustrated. The hook 3 comprises a distal end 3a and a proximal end 3b. A curved elongated portion provided with a helix-shaped protrusion extends between the distal end 3a and the proximal end 3b. At the proximal end 3b, the hook 3 is provided with a sole attachment portion 3c. The attachment portion 3c can be integrated as one unit with the hook 3 or alternatively be a separate part which is attachable to the hook such that they together form the hook 3. The attachment portion 3c is further described below.

Figure 2:
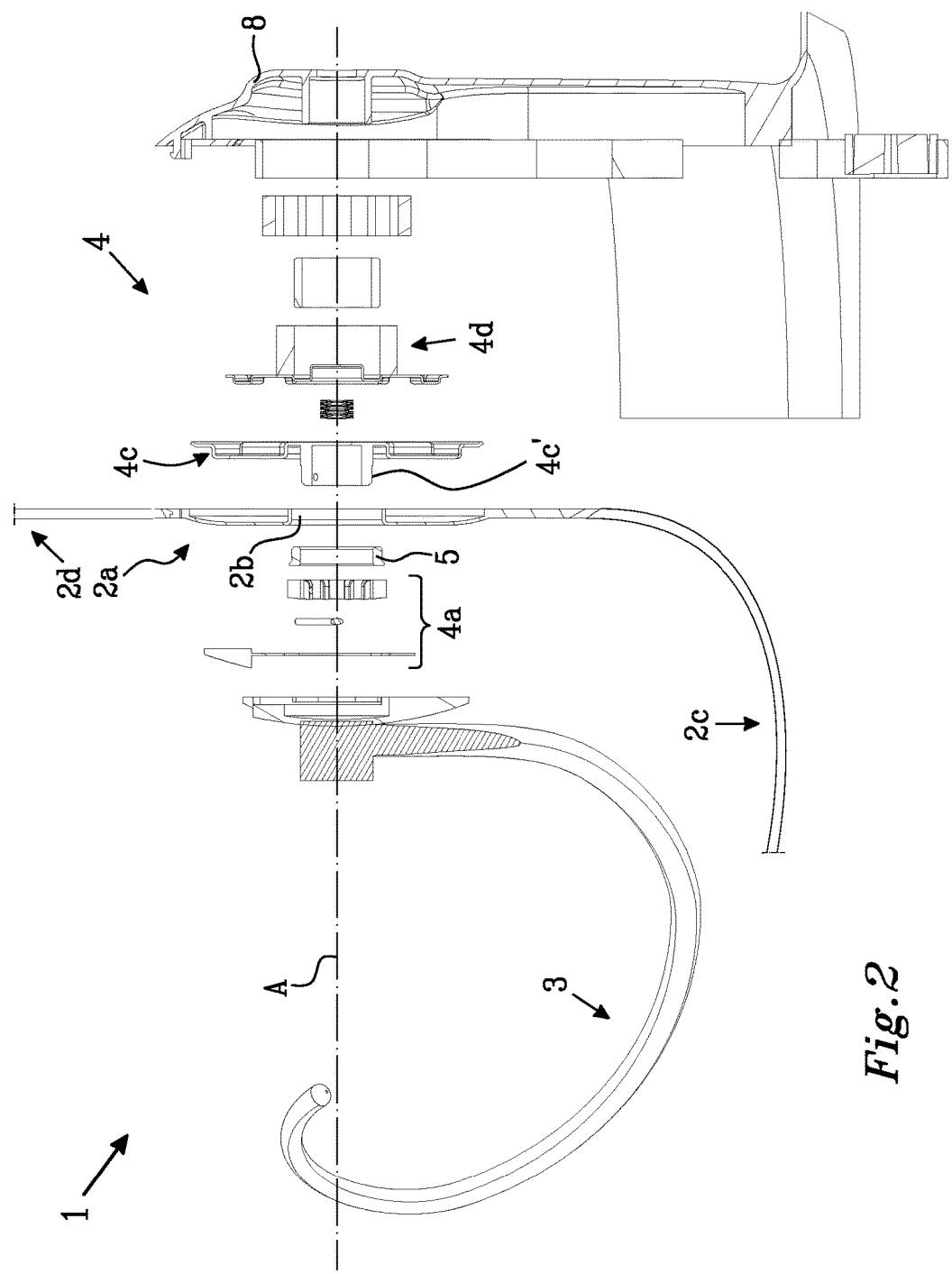
FIG. 2 illustrates a cross section of the household appliance mixing arrangement according to some other embodiments.

Next to the hook 3 are illustrated: a drive arrangement 4, a sealing 5 and a side wall portion 2a of a mixing container. The side wall portion 2a comprises a through hole 2b. In order to better illustrate the mechanism of the mixing arrangement 1, only the side wall portion 2a, which is a part of the mixing container wall, is illustrated in FIG. 1. In FIG. 2 a larger part of the mixing container is illustrated, and in FIG. 3 the entire mixing container is illustrated.

When assembled, the attachment portion 3c abuts an inner surface of the side wall portion 2a around the trough hole 2b, such that ingredients, at least to some extent, are prevented from escaping the mixing container via the through hole 2b. Also the sealing 5 is arranged to prevent leakage via the through hole 2b.

The drive arrangement 4 comprises a quick-release-hook-attachment arrangement 4a, a first coupling member 4c and a second coupling member 4d.

In an assembled state, the hook 3 is attached to the quick-release-hook-attachment arrangement 4a. In the FIG. 1 embodiment the quick-release-hook-attachment arrangement 4a is a locking pin arrangement. The locking pin arrangement comprises a male and a female member which, when locked to each other, secures the hook 3 to the first coupling member 4c. The hook 3 and the quick-release-hook-attachment arrangement 4a could alternatively be secured to each other by a snap-lock arrangement, a bayonet coupling arrangement, threads or the like. Any attachment means which provides for a reliable and easy-to-use hook attachment can be used. The hook 3 can be attached and detached relatively the quick-release-hook-attachment arrangement 4a without any tools.

As mentioned, the drive arrangement 4 also comprises the first coupling member 4c. In an assembled state, the quick-release-hook-attachment arrangement 4a is locked also relatively the first coupling member 4c. Hereby the first coupling member 4c is able to transfer a rotational movement around the axis of rotation A to the quick-release-hook-attachment arrangement 4a and the hook 3. In the FIG. 1 embodiment both the first coupling member 4c and the quick-release-hook-attachment arrangement 4a comprise longitudinal grooves/ribs which are arranged to transfer the rotational movement. At least a major part of the quick-release-hook-attachment arrangement 4a is arranged inside the mixing container 2 and at least a major part of the first coupling member 4c is arranged outside of the mixing container 2.

Outside of the mixing container 2 and next to the first coupling member 4c the second coupling member 4d is arranged. The first 4c and second 4d coupling members have complementary shaped portions and/or are provided with ribs/grooves which are complementary to each other. Hereby the second coupling member 4d can transfer a rotational movement from an electric motor to the first coupling member 4c, when the first and second coupling members are engaged to each other. The first coupling member 4c can be attached to/removed from the second coupling member 4d by movement thereof along a direction which is substantially in parallel with the axis of rotation A.

The second coupling member 4d will be brought to rotate by an electric motor. Such an electric motor could be directly or indirectly connected to the second coupling member 4d. In the embodiment illustrated in FIG. 1, a drive member 7 is arranged to put the second coupling member 4d in motion. A first portion 7a of the drive member 7 is, in the assembled state, connected to the second coupling member 4d, while a second portion 7b is connected to the electric motor.

In FIG. 1 is also illustrated part of a housing 8. The housing 8 will enclose the electric motor, the drive member 7 and other parts, such that they are protected. The housing 8, or parts thereof, can also constitute a support for the open top mixing container.

FIG. 2 illustrates a household appliance mixing arrangement 1 which generally corresponds to the embodiment described in accordance with FIG. 1, but the hook 3 does not comprise any helix-shaped protrusion. FIG. 2 illustrates a cross section of the household appliance mixing arrangement 1 in an exploded view. In FIG. 2 is also illustrated a bottom portion 2c and an upper portion 2d of the mixing container. The first coupling member 4c comprises a flange 4c'. The flange 4c' can be arranged to extend into the interior of the mixing container via the through hole 2b, whereby the quick-release-hook-attachment arrangement 4a can be attached to the flange 4c'. The mixing container with its through hole 2b can be thread onto the flange 4c' whereby the quick-release-hook-attachment arrangement 4a can be attached to the flange 4c'.

In FIG. 2 the sealing 5 is illustrated as a separate part, but in other embodiments the sealing 5 can be attached to the mixing container or the flange 4c'. In the assembled state the sealing 5 is arranged radially outwards of the flange 4c', towards a cylindrical surface which forms the through hole 2b of the mixing container.

The hook 3 is rotatable around a substantially horizontal axis of rotation A within the mixing container 2, when the hook 3 is attached to the drive arrangement 4 and abuts the inside of the mixing container 2.

In FIG. 2 the hook 3 is illustrated in its lowermost position. The hook 3 is in the lowermost position when the centre of gravity of the hook 3 is as low as possible within the mixing container 2. The lowermost position is also illustrated in FIG. 3.

Figure 3:
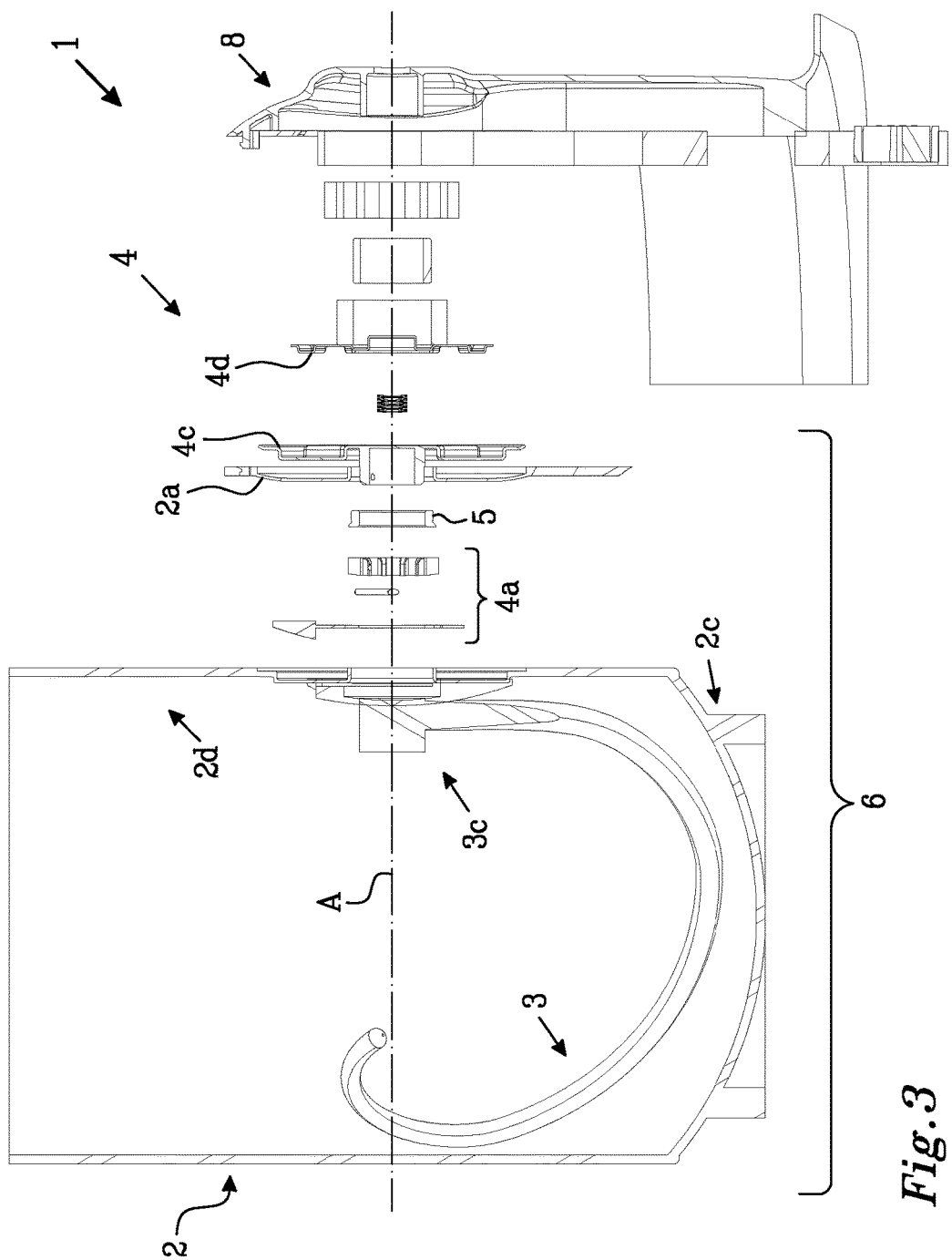
FIG. 3 illustrates another cross section view of the FIG. 2 household appliance mixing arrangement.

The exploded view cross section of FIG. 3 generally corresponds to FIG. 2, but in FIG. 3 the first coupling member 4c is illustrated when the flange 4c' is inserted into the trough hole of the mixing container 2. In FIG. 3 the drive arrangement 4, the sealing 5, the housing 8 and the side wall portion 2a of the mixing container 2 are schematically illustrated in a larger scale as compared to the mixing container 2 and the hook 3.

When the attachment portion 3c of the hook 3 and the quick-release-hook-attachment arrangement 4a are attached to each other via the through hole, the hook 3, the quick-release-hook-attachment arrangement 4a, the mixing container 2, the sealing 5 and the first coupling member 4c together forms an assembly 6. The assembly 6 is detachable as one unit from the second coupling member 4d and other parts, such as the housing 8 and the electric motor.

The mixing container 2 can be made of any durable material, such as plastics, metal and/or glass and the hook 3 can be made e.g. of metal and/or plastics.

As illustrated in FIG. 3, the hook 3 has a substantially horizontal axis of rotation A and the mixing container 2 is an open top mixing container. Since the hook 3 is attached to the drive arrangement 4 via the through hole in the side wall portion of the mixing container 2, a user who would like to add ingredients, e.g. during baking, mixing and/or kneading, can easily do so since no drive arrangements or other parts of the household appliance mixing arrangement 1 obstruct the mixer container opening. The hook 3 rotates near the inner surface of the mixing container 2 such that the ingredients are pressed, kneaded and well-mixed between the hook 3 and the inner surface when the hook 3 is rotated. The hook 3 could have a curved elongated shape. A curved elongated shape of the hook 3 has proven to be exceptionally efficient for catching and bringing the foodstuff to be mixed and kneaded over the length of the hook 3.

The invention claimed is:

1. A household mixer appliance comprising:
   a hook;
   a drive arrangement operatively connectable to the hook and, when connected to the hook, configured to rotate the hook around an axis of rotation within an open top mixing container, wherein the mixing container comprises a side wall portion having a through hole for the drive arrangement; and
   a seal arranged between the drive arrangement and the side wall portion of the mixing container, wherein the seal is fitted in the through hole between the side wall portion of the mixing container and the drive arrangement;
   wherein the drive arrangement comprises a bayonet coupling arrangement as a quick-release mechanism to which the hook is attached.

2. The household mixer appliance according to claim 1, wherein the hook comprises:
   a distal end; and
   a proximal end provided with a sole attachment portion that is arranged to be attachable to the quick-release mechanism of the drive arrangement.

3. The household mixer appliance according claim 1, wherein the axis of rotation is substantially horizontal.

4. The household mixer appliance according to claim 1, wherein the drive arrangement comprises a first coupling member that is at least partly arranged to extend into the through hole of the mixing container.

5. The household mixer appliance according to claim 4, wherein the hook is attachable to the first coupling member via the quick-release mechanism.

6. The household mixer appliance according to claim 4, wherein the hook and the mixing container are detachable from the drive arrangement when the hook is detached from the quick-release mechanism.

7. The household mixer appliance according to claim 4 wherein the first coupling member comprises a flange, and where the seal is arranged radially outwards of the flange, towards a cylindrical surface that forms the through hole.

8. The household mixer appliance according to claim 4, wherein the seal and the first coupling member together are arranged to seal off the through hole when the hook is attached to the drive arrangement.

9. The household mixer appliance according to claim 4, wherein the drive arrangement comprises a second coupling member that is arranged to transfer rotational movement from an electric motor to the hook via the first coupling member.

10. The household mixer appliance according to claim 9, wherein the hook, the quick-release mechanism, the mixing container, the seal and the first coupling member together form an assembly that is detachable as one unit from the second coupling member.

11. A household mixer appliance comprising:
a hook;
a drive arrangement operatively connectable to the hook and, when connected to the hook, configured to rotate the hook around an axis of rotation within an open top mixing container, wherein the mixing container comprises a side wall portion having a through hole for the drive arrangement; and
a seal arranged between the drive arrangement and the side wall portion of the mixing container, wherein the seal is fitted in the through hole between the side wall portion of the mixing container and the drive arrangement;
wherein the drive arrangement comprises a snap-lock arrangement as a quick-release mechanism to which the hook is attached.

* * * * *